March 24, 1931.   C. S. KELLEY   1,797,424
SOUND PRODUCER
Filed June 18, 1930
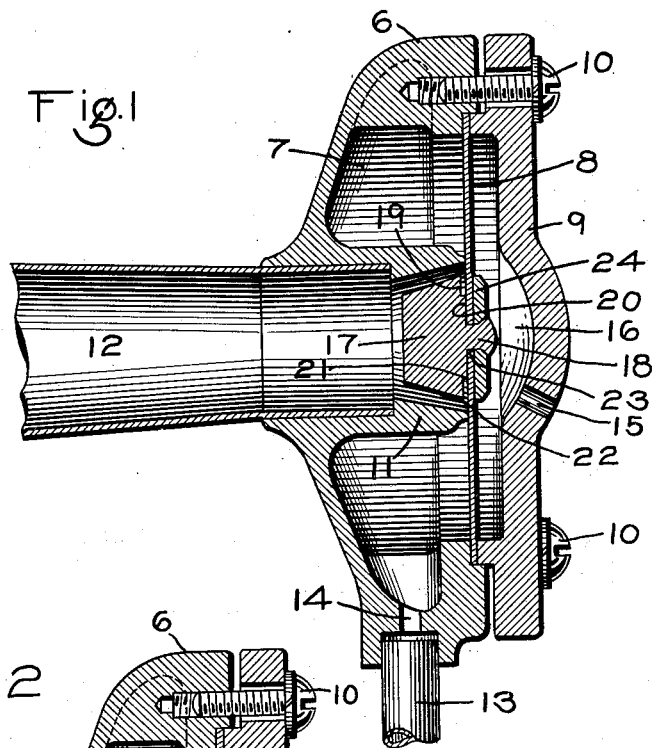
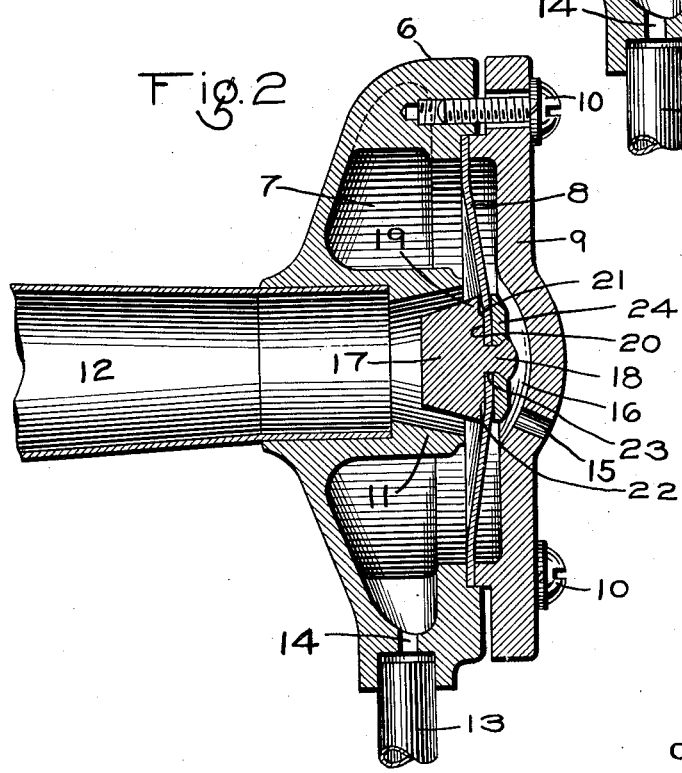
INVENTOR.
CECIL S. KELLEY
BY
*Wm. M. Cady*
ATTORNEY.

Patented Mar. 24, 1931

1,797,424

UNITED STATES PATENT OFFICE

CECIL S. KELLEY, OF EAST McKEESPORT, PENNSYLVANIA, ASSIGNOR TO THE WESTING-HOUSE AIR BRAKE COMPANY, OF WILMERDING, PENNSYLVANIA, A CORPORATION OF PENNSYLVANIA

SOUND PRODUCER

Application filed June 18, 1930. Serial No. 461,962.

This invention relates to sound producing devices, and more particularly to the type of sound producing devices employing a vibratory diaphragm.

Heretofore, it has been proposed to provide the flexible diaphragm of sound producing devices with a weight, so that a more positive opening and closing movement of the diaphragm will be obtained. One type of sound producing device having a weighted diaphragm is shown in United States Letters Patent No. 1,679,011, of R. G. Widmyer, issued July 31, 1928.

As shown in the patent, the weight is riveted to the diaphragm, and a washer is interposed between the head of the rivet and the face of the diaphragm, the weight being disposed on one side of the diaphragm, and the washer being mounted on the opposite side thereof. The central portion of the surface of the weight facing the diaphragm is flat, and the remaining portion of this part of the weight is cut away on an arc, so as to permit flexing of the diaphragm. The diameter of the washer is substantially the same as the diameter of the portion of the weight bearing against the diaphragm, the diameter of the washer being slightly larger than the head of the rivet and much smaller than the diameter of the weight, so that the portion of the diaphragm thus clamped between the weight and the washer is of relatively small area.

With the diaphragm constructed in the above described manner, it has been found that when the device is operated, the arched face of the weight does not meet the face of the diaphragm tangently, when the diaphragm is flexed away from its normal position, and when the diaphragm returns to its normal position against the mouth of the resonance tube, the momentum of the weight has a tendency to flex the central portion of the diaphragm inwardly.

As a result of this, constant vibration of the diaphragm often results in a fracture of the diaphragm in a zone surrounding the point the weight is fastened to the diaphragm, since the arched face of the weight bites into the face of the diaphragm on one side, when the diaphragm moves outwardly, while the periphery of the washer bites into the opposite face of the diaphragm when the diaphragm moves inwardly. In this way the weight is sheared from the diaphragm, so that the device is rendered useless.

An object of this invention is to provide an improved sound producing device in which the above difficulties are overcome.

Another object of the invention is to provide an improved sound producing device of the character mentioned which is simple in construction, and reliable and exact in function under all conditions of service.

The invention also comprises certain new and useful improvement in the construction, arrangement and combination of the several parts of which it is composed, as will be hereinafter more fully described and claimed.

In the accompanying drawing: Figure 1 is a section of a sound producing device embodying the invention, showing the flexible diaphragm in the normal inoperative position; and Fig. 2 is a view similar to Fig. 1, showing the diaphragm flexed outwardly to illustrate the manner in which the diaphragm engages the weight.

Referring to the drawing, the sound producing device may comprise a casing 6 having a chamber 7, which is open to a flexible diaphragm 8, said diaphragm being clamped in position by a cover plate 9, which is secured to the casing 6 by screws 10.

The casing is provided with a central tube 11, which projects inwardly toward the diaphragm 8. Secured to the tube 11 is a suitable amplifying horn 12. When the parts are assembled, the free end of the tube 11 just engages the face of the diaphragm 8, as shown in Fig. 1.

The chamber 7 is connected to a pipe 13 through which fluid under pressure is supplied to said chamber, the rate of flow being governed by a restricted port 14 formed in the casing 6 between the end of the pipe and the chamber.

An opening 15 is provided in the cover plate 9, so that chamber 16 at the outer face of the diaphragm 8 remains at atmospheric pressure at all times.

Mounted on the central portion of the diaphragm 8 and extending into the open end of the tube 11, is a weight 17.

As shown, the weight 17 is preferably in the form of a truncated cone, formed from a single piece of material, and having a stem or shank 18 projecting rearwardly therefrom.

The shank 18 passes through an opening 23 in the diaphragm and a washer 24 on the outer face of the diaphragm, the extended portion of the shank being peened over, so that the weight is rigidly secured to the diaphragm.

In order that the diaphragm 8 can readily flex outwardly from its normal flat or straight position during the operation of the device, the outer portion of the base of the weight 17 is cut away, as indicated at 19, so as to provide a central flat surface 20, of less diameter than the diameter of the base of the weight, for bearing against the inner face of the diaphragm.

A pronounced step 21 is formed between the portions 19 and 20 of the base of the weight, and at the outer periphery of the base of the weight, there is a corner 22, the purpose of which will be hereinafter more fully described.

In operation, when fluid under pressure is supplied to pipe 13, fluid flows through the restricted port 14 into chamber 7, and the pressure of fluid in chamber 7 builds up so that the diaphragm 8 is moved outwardly.

In moving out, communication is opened from chamber 7 to the space within the tube 11. The pressure in chamber 7 is then quickly reduced, since the rate of flow through the restricted port 14 is considerably less than the rate of flow from chamber 7 to tube 11. The pressure on the diaphragm 8 being thus relieved, said diaphragm returns to its position engaging the end of the tube 11. The opening movement is then repeated.

The diaphragm 8 is thus caused to vibrate and thereby produces a sound which is amplified by the usual operation of the horn 12.

The wieght 17 makes it necessary for the fluid pressure to be built up to a higher point before the diaphragm will move away from the end of the tube 11, than would be the case with an unweighted diaphragm, but when the diaphragm does move, the higher pressure causes a greater movement of the diaphragm, and consequently, a greater amount of potential energy is stored up, so that the return movement of the diaphragm is effected more forcibly.

In this action, it is desirable to provide means for limiting the outward movement of the diaphragm 8, so that the rebound thereof will be dampened. This is accomplished by so forming the weight 17, that when the diaphragm moves outwardly, the inner face of the diaphragm will engage the outer edge or corner 22 of the weight, as shown in Fig. 2.

It will be noted that the diaphragm travel is small, and therefore the deflection of the diaphragm outwardly is also small, so that the inner face of the diaphragm engages the corner 22 of the weight before the elastic limit of the diaphragm is reached.

Since the diaphragm 8 normally engages the surface 20 of the weight, when the diaphragm moves outwardly and strikes the outer edge 22 or periphery of the weight, a greater surface of the diaphragm will be engaged, and therefore the movement of the diaphragm is arrested. However, if the force of the diaphragm is great, the diaphragm will deflect slightly further, due to the momentum of the weight, before returning to its normal position. In this way the movement of the diaphragm will be gradually arrested when the periphery of the base of the weight is engaged. The corner 22 therefore provides a resilient stop.

Heretofore, in manufacturing devices of the type herein described, a comparatively small washer was used in riveting the weight to the diaphragm. It has been found that the use of a small washer, while it prevented the head of the rivet from pulling through the opening in the diaphragm, provided such a small bearing surface, that the periphery of the washer would cut into the face of the diaphragm during the operation of the device.

With the central portion of the weight bearing against the diaphragm on one side, and with a washer of relatively small diameter bearing against the opposite side of the diaphragm, the body of the diaphragm was soon sheared in a zone surrounding the rivet.

The cause of this shearing can be attributed to two things, namely, the cutting into the surface of the diaphragm by the base of the weight when the diaphragm moves outwardly, and the cutting into the surface on the opposite side of the diaphragm by the periphery of the washer when the diaphragm returned to its normal position, this latter effect being produced by the momentum of the weight on the opposite side of the diaphragm pulling the washer against the outer face of the diaphragm, when further inward movement of the diaphragm is prevented by the mouth of the tube 11. By providing the weight with the two spaced apart surfaces for engaging the diaphragm in the manner hereinbefore described, the wear of the inner face of the diaphragm has been reduced to a minimum.

It has been found that if the area of the washer is considerably greater than the area of the surface of the weight normally bearing against the inner face of the diaphragm, the pressure of the edge of the washer against the face of the diaphragm is reduced to such extent that no injurious effects are produced when the diaphragm vibrates. Accordingly, the washer 24 is shown in the present case as having a diameter considerably greater than the diameter of the surface 20 of the weight. If so desired, the washer can be made of approximately the same diameter as the diameter of the base of the weight, so that when the diaphragm is returning to its normal position after moving outwardly, the washer will present a surface of considerable area for engaging the outer face of the diaphragm.

During the operation of the device, the diaphragm vibrates with rapidity, and in so doing the weight carried thereby attains considerable momentum, which is arrested by the diaphragm at each end of its movement.

In the movement of the diaphragm 8 away from the end of the tube 11, the weight 17 is first pulled, and then the momentum of the weight pushes the diaphragm. On the other hand, in the return movement, the diaphragm first pushes the weight, and when the diaphragm approaches its normal position against the end of the tube 11, the momentum of the weight has a tendency to pull the diaphragm, so that when further inward movement of the diaphragm is prevented by the mouth of the tube 11, the central portion of the diaphragm is flexed inwardly by the force of the weight.

By providing the washer 24 with a large diameter as shown, when the diaphragm tends to flex inwardly, the area of the surface of the washer which engages the face of the diaphragm is so great that the movement of the diaphragm is arrested by the time the periphery of the washer engages the face of the diaphragm.

In this way, wear on the opposite faces of the diaphragm is reduced to a minimum, and therefore the life thereof is materially prolonged.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A sound producing device comprising a flexible diaphragm adapted to be operated by fluid under pressure, a weight mounted on one side of said diaphragm for controlling the operation thereof, the portion of said weight facing said diaphragm having a surface of relatively small area bearing against the diaphragm and a surface of greater area spaced slightly from the diaphragm when the diaphragm is in its normal inoperative position, and means for rigidly fastening the weight to the diaphragm, comprising a washer disposed on the side of the diaphragm opposite to the weight, said washer having an area greater than the area of the bearing surface of the weight, and a headed shank projecting rearwardly from the weight and passing through the diaphragm and washer.

2. A sound producing device comprising a diaphragm adapted to be operated by fluid under pressure, a weight mounted on one side of said diaphragm for controlling the operation thereof, the portion of said weight facing said diaphragm having a surface of relatively small area for bearing against the diaphragm, and means for rigidly securing the weight to the diaphragm comprising a washer disposed on the side of the diaphragm opposite to the weight, said washer having an area greater than the area of the bearing surface of the weight, and a headed shank projecting from the weight and passing through the diaphragm and said washer.

3. A sound producing device comprising casing having a chamber, a flexible diaphragm subject to the pressure of fluid in said chamber, a vent tube normally in engagement with said diaphragm and controlling communication from said chamber to said tube, a weight carried by said diaphragm, the portion of said weight facing said diaphragm having a surface of relatively small area for bearing against the diaphragm, and means for rigidly securing the weight to the diaphragm comprising a washer on the side of the diaphragm opposite to the weight, said washer having an area greater than the area of the bearing surface of the weight, and a headed shank projecting from the weight and passing through the diaphragm and said washer.

4. A sound producer comprising a flexible diaphragm adapted to be operated by fluid under pressure, a member mounted on one side of said diaphragm for controlling the operation thereof, said member having two portions of different areas for engaging said diaphragm, one of said portions being always in engagement with the diaphragm and the other portion being adapted to engage with the diaphragm when the diaphragm is flexed outwardly, the second portion being greater in area than the first portion, a shank carried by said member and passing through the diaphragm, and a bearing element carried by the shank on the side of the diaphragm opposite to said member and having a larger bearing surface than the portion of said member always in engagement with the diaphragm.

In testimony whereof I have hereunto set my hand, this 16th day of June, 1930.

CECIL S. KELLEY.